United States Patent [19]
Fischer et al.

[11] 3,967,303
[45] June 29, 1976

[54] ACCESSORY ATTACHMENT FOR CAMERAS

[75] Inventors: Richard V. Fischer, West Warwick, R.I.; Richard C. Kee, Chestnut Hill, Mass.

[73] Assignee: Polaroid Corporation, Cambridge, Mass.

[22] Filed: Dec. 16, 1974

[21] Appl. No.: 533,329

[52] U.S. Cl. .............................. 354/295; 354/126
[51] Int. Cl.² ....................................... G03B 17/56
[58] Field of Search ............... 354/295, 80, 81, 82, 354/126, 187, 189, 286, 287, 293, 354; 240/73 QD; 224/5 V

[56] References Cited
UNITED STATES PATENTS

| | | | |
|---|---|---|---|
| 587,151 | 7/1897 | Lavercombe | 240/73 QD |
| 1,090,374 | 3/1914 | Barnhart | 240/73 QD |
| 2,889,095 | 6/1959 | Heidecke et al. | 224/5 V |
| 3,820,135 | 6/1974 | Dickson | 354/81 |

FOREIGN PATENTS OR APPLICATIONS

| | | | |
|---|---|---|---|
| 797,110 | 6/1958 | United Kingdom | 354/287 |

*Primary Examiner*—L. T. Hix
*Assistant Examiner*—E. M. O'Connor
*Attorney, Agent, or Firm*—John W. Ericson

[57] ABSTRACT

An accessory attachment for use with a camera of the type having a frontal housing for an objective lens, a shutter mechanism, camera function-controlling devices such as photocells and shutter or control knobs or buttons, and having a socket for mounting a flashlamp. The attachment serves to mount accessories such as auxiliary portrait, wide-angle, or telephoto lenses, filter lenses for the camera's objective lens and photocell, auxiliary shutter or control knobs, and flash equipment, in operative relation to the corresponding elements of the camera. The attachment comprises a housing mounting the accessories, receivable against wall-forming means of the camera, and having hook elements engageable with an element of the wall means. A plug secured to the accessory attachment is slidably receivable in the flashlamp socket of the camera to cooperate with the hook elements in locating and securing the attachment. A recess is formed in the attachment for receiving the viewfinder of a camera to which it is attached.

2 Claims, 3 Drawing Figures

ACCESSORY ATTACHMENT FOR CAMERAS

BACKGROUND AND BRIEF DESCRIPTION OF THE INVENTION

This invention relates to means for conveniently attaching accessories to cameras, and has special application to cameras of the kind having a frontal housing for mounting such elements as an objective lens, a shutter mechanism, a photographic process-controlling photocell, flash equipment, or related devices.

Cameras of a type in connection with which this invention will be particularly described are disclosed and claimed, inter alia, by U.S. Pat. Nos. 3,714,879 and 3,810,211, which are assigned to the assignee of this application. These patents pertain to compact collapsible cameras of the self-developing type, now well known in the art and in common use. Such a camera includes a lens-shutter housing of generally parallelepiped form, having a front wall in which an objective lens and camera functioncontrolling devices are mounted, and side, top, and bottom walls which extend rearwardly to terminate in rear corners, between which a light-tight enclosure, housing film for sequential exposure by the shutter mechanism, adjoins the rear portion of the lens-shutter housing. The enclosure is formed by a series of housing members, which are pivotally connected with the lens-shutter housing in a collapsible four-bar linkage, so that the camera may be folded into a flat, compact form.

It is often desired to employ various camera accessories for special photographic purposes. These accessories include flash and strobe-light equipment; special lenses for close-ups, telephoto, or wide-angle photography; filters for haze or for special effects; and remote-control and time-delay equipment. It is of great convenience to the photographer to be able to attach and detach such auxiliaries quickly, and with a minimum of manipulation. Further, the accessories should be as compact as possible, so as not to overburden the photographer. These requirements acquire even more pronounced importance in relation to cameras which are intended to be specially compact so that they can be carried in pocket or purse, rather than in bulky and cumbersome shoulder cases.

But the very compactness of such cameras poses obstacles to the convenience of attaching accessories, and of making necessary electrical and mechanical connections. The necessarily small lens-shutter housing is already rather crowded by the elements which must be mounted on it, and which must have open access; these include the objective lens, a photocell and manual knobs for controlling the camera settings, an actuator or shutter button, and sockets for flash or strobe lights and for remote-control or time-delay cables. The difficulty is therefore to mount and connect any desired accessories without obscuring or blocking any of the elements of the camera proper.

The general object of the present invention is to afford photographers convenient, easily and quickly mountable and demountable means for attaching accessories in operative relation to cameras. Further objects and advantages of the invention will become apparent as the following description proceeds.

DESCRIPTION OF THE DRAWINGS

While the specification concludes with claims particularly pointing out the subject matter which is regarded as the invention, it is believed that a clearer understanding may be gained from the following description of a preferred embodiment, referring to the accompanying drawing, in which:

DESCRIPTION OF THE PREFERRED EMBODIMENT

Figure 1:
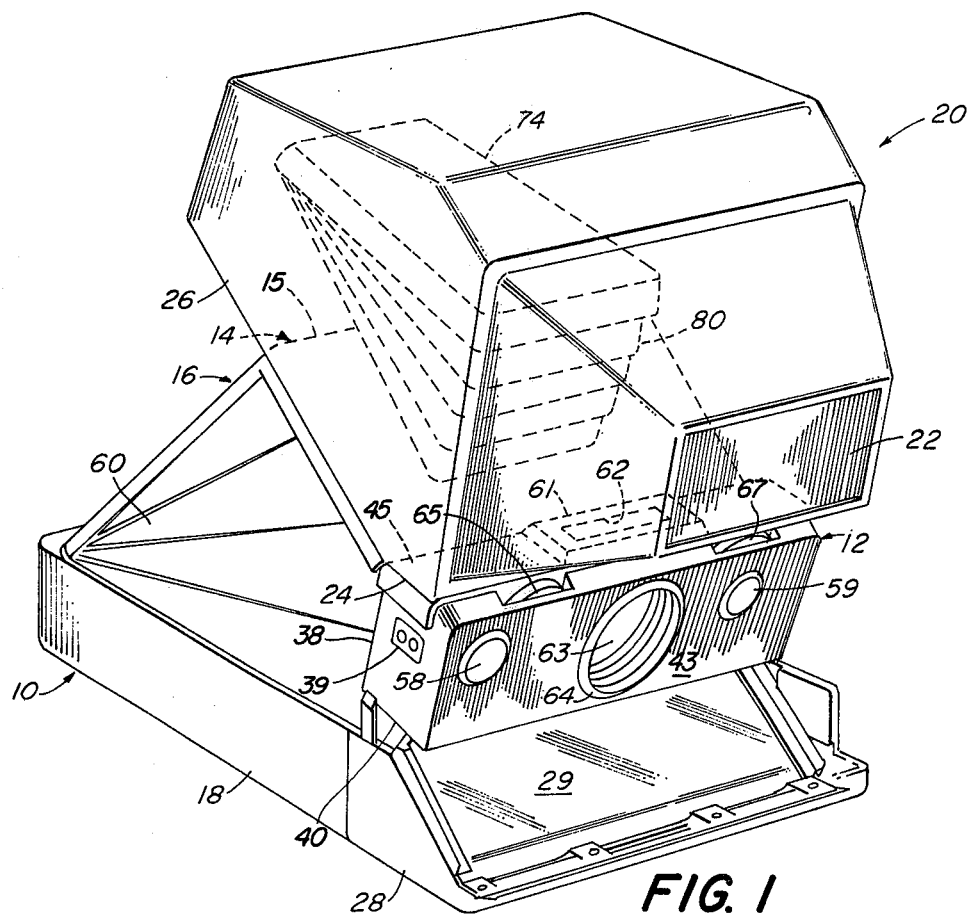
FIG. 1 is a pictorial view of the improved accessory attachment mounted on an illustrative camera of a type with which the invention may be employed.
Figure 2:
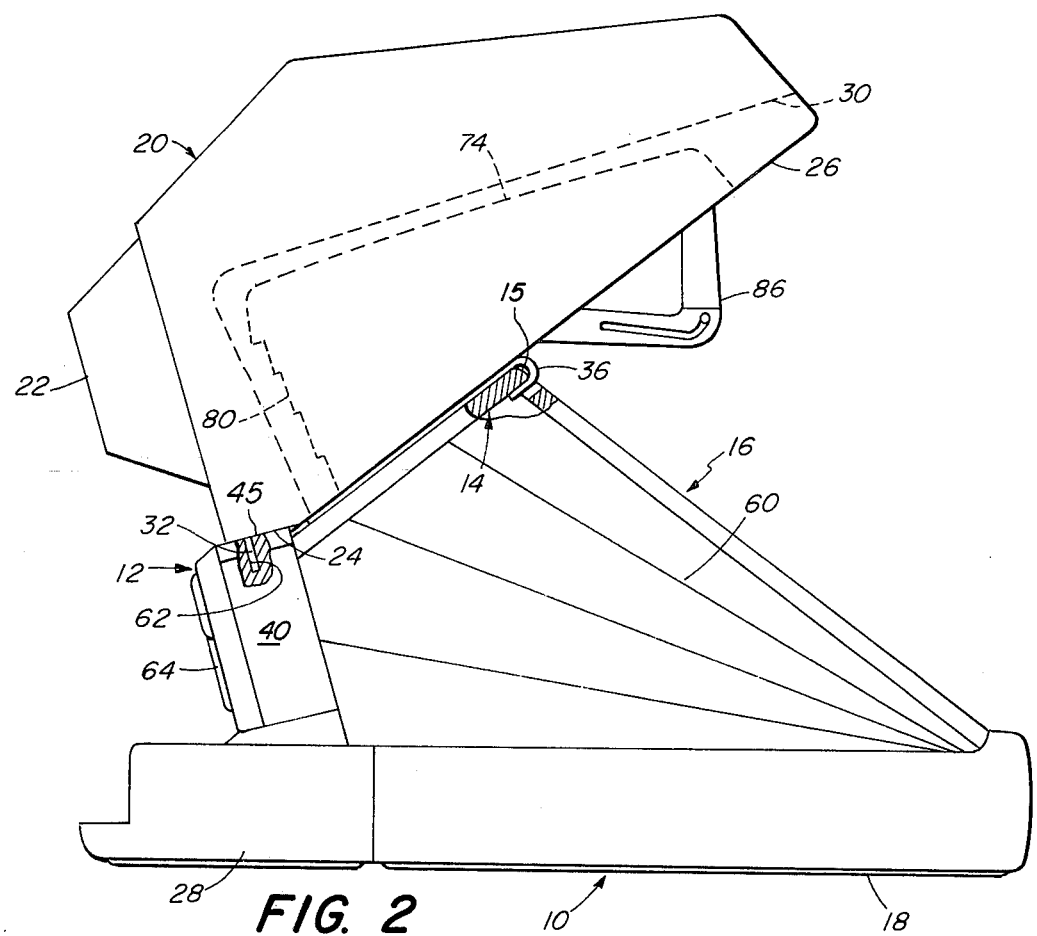
FIG. 2 is a view in side elevation and partially in section of the apparatus of FIG. 1.
Figure 3:
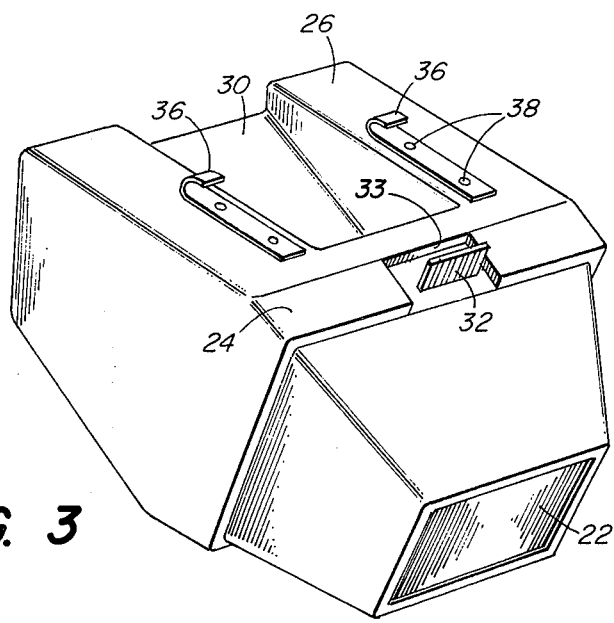
FIG. 3 is a pictorial view showing the bottom of the attachment of FIGS. 1 and 2.

Referring to FIGS. 1 and 2, a camera is generally indicated at 10, which is of a general type suitable for use with the improved accessory attachment. The illustrated camera is collapsible, as described more fully in the aforementioned U.S. Pat. Nos. 3,714,789 and 3,810,211, but is shown in its extended operative condition. It includes a series of housing members 14, 16, 18 and a lens-shutter housing 12, which are pivotally connected to form a collapsible four-bar linkage so that the camera may be folded into a flat, compact form. An additional housing member 28 is hinged to the housing member 18, and normally latched in the position shown. When unlatched, the housing member 28 can be swung down to open and entry slot for insertion of a film magazine (not shown) into the camera; this slot is normally closed by a pivoted, resiliently biased light-shielding plate member 29 carried on the housing member 28. A light-tight enclosure for receiving the film magazine is defined by the aforementioned housing members and by a collapsible bellows 60. The housing member 14 supports a collapsible viewing device 74 which includes telescoping blades 80, and a linkage 86 to erect a mirror and lens system (not shown) when the camera is opened, to allow reflex viewing through an objective lens 63 of any scene to be photographed.

The lens-shutter housing 12 is generally parallelepiped in form, having a front wall 43, rearwardly-extending side walls 40 terminating in rear corner portions 38, and a top wall 45. The top wall 45 is provided with a flash unit support pedestal 61, in which a socket 62 is formed to receive a connecting plug of a flash unit (not shown) of a type more fully described by U.S. Pat. No. 3,759,153, assigned to the assignee of this application. One of the side walls 40 is formed with a socket 39 for the connection of a suitable cable (not shown) for remote-control operation of the camera.

The housing 12 encloses a suitable shutter mechanism (not shown). The objective lens 63 is centrally mounted in the front wall 43, and surrounded by a bezel 64. To its left is located a transparent lens 59 for admitting incident light from any scene viewed by the objective lens to a photocell (not shown) for controlling the photographic functions of the camera in a known manner. A camera cycle start button 58, commonly referred to as a shutter button, is set to the right of the objective lens. The upper edge of the front wall is formed with recesses to accommodate a manual lens-focusing knob 65, and a manual light/dark control knob 67 which adjusts the relationship between the camera settings and the controlling photocell responses in a known fashion.

It will be apparent that the crowded condition of a compact lens-shutter housing resulting from the necessary presence of all these elements, combined with the requirement not to obscure or render any of them inaccessible, poses a material obstacle to convenient attachment of camera accessories such as auxiliary lenses, flash equipment, and the like.

It will be observed that the top wall 45 of the lens-shutter housing 12 is inclined to the upper housing member 14, and that the two combine to form a top wall for the camera.

According to the present invention, an accessory attachment comprises a housing 20 mounting a camera accessory, which is illustrated as an electronic flash unit 22. The housing encloses the battery, electronic circuit, discharge tube and reflector of the flash unit. It is the function of the attachment to mount this accessory in operative relation to the camera, and to make such electrical connections as may be required to operate the accessory in appropriately-timed relation to the camera. The attachment bears a protruding connecting plug 32 which is slidably receivable in the socket 62 of the pedestal 61, and which serves both to locate the attachment relative to the lens-shutter housing 12 in the plane of its top wall 45, and to form electrical connections with the camera's function-controlling means required to operate the accessory. Appropriate connecting means are well known in the art, as for example from the aforementioned U.S. Pat. No. 3,759,153, and no further description thereof is believed necessary for an understanding of the present invention.

The housing 20 has lower relatively-inclined intersecting surfaces 24 and 26, these surfaces being conformably receivable on the top wall 45 of the lensshutter housing and the upper housing member 14, respectively. The surface 24 is recessed at 33 to receive the pedestal 61. The inclined surface 26 is formed with a central recess 30 for receiving the viewing device 74 in its raised, operative position, as shown in FIG. 2. On opposite sides of this recess, a pair of latch members or hooks 36 are attached to the housing 20 by means of rivets or other suitable fasteners 38. The hooks 36 are engageable over a rear edge 15 of the upper housing member 14, as shown in FIG. 2.

To mount the attachment on the camera, the hooks 36 are first engaged under the rear edge 15 of the upper housing member, with the housing 20 tilted clockwise from the position shown in FIG. 2, and the plug 32 spaced apart from the socket 62. Then the attachment is tipped in the counterclockwise direction in FIG. 2 to slide the plug downwardly into the socket. The combination of the plug and the hooks holds the attachment in place on the camera with adequate security. The attachment may readily be removed when desired by tipping it in the clockwise direction in FIG. 2 to withdraw the plug 32 from the socket 62, rotating the attachment around the hooks 36, and then withdrawing the attachment upwardly and to the right to disengage the hooks from the rear edge 15 of the upper housing member 14.

The invention has been described in specific connection with a flash unit accessory. However, it will be apparent that other types of accessories may be mounted on a camera by the same attachment means. For example, a sun shade, filter, or auxiliary lens may be mounted by the attachment in aligned relation with, and in front of, the camera's objective lens 63, by extending the housing 20 downwardly and forwardly to overly the front wall 43 of the lens-shutter housing 12.

The latch members or hooks 36 are shown engaging the rear edge of the upper housing member 14. Optionally, the hooks may engage any rearwardly-facing edge surface or recess suitably formed on the upper housing member for this purpose.

What is claimed is:

1. An electronic flash attachment for a camera having a lens-shutter housing formed with a front wall mounting a lens and a top wall extending rearwardly from the front wall and formed with a downwardly extending socket, and further including an upper housing wall extending rearwardly and upwardly from the top wall of the lens-shutter housing and formed with a rear edge portion, and a viewfinder mounted on the upper housing wall, said electronic flash attachment comprising an electronic flash unit, a housing mounting said flash unit therein, and means for detachably connecting said housing to the camera, said housing comprising first housing wall means forming a lower surface adapted to engage and be supported on the top wall of the lens-shutter housing of the camera, second housing wall means inclined rearwardly and upwardly from and formed integral with said first housing wall means and adapted to engage and be supported on the upper housing wall of the camera, third housing wall means formed integral with said second housing wall means and forming a recess shaped to receive the viewfinder of the camera, and fourth housing wall means formed integral with said first, second and third housing wall means and completing an enclosure about said electronic flash unit including housing regions on four sides of said third housing wall means, said means for detachably connecting said housing to the camera comprising a plug mounted on said first housing wall means, protruding therefrom, and formed to engage the socket of the camera, and first and second hook means attached to said second housing wall means on either side of said third housing wall means and adapted to engage the rear edge portion of the upper housing wall of the camera.

2. Detachably connectable photographic apparatus, comprising a camera having a lens-shutter housing formed with a front wall mounting a lens and a top wall extending rearwardly from said front wall and formed with a downwardly extending socket, said camera further including an upper housing wall extending rearwardly and upwardly from said top wall and formed with a rear edge portion, and a viewfinder mounted on said upper housing wall, an electronic flash attachment detachably connected to said camera and comprising an electronic flash unit, an accessory housing mounting said flash unit therein, and means for detachably connecting said accessory housing to said camera, said accessory housing comprising first housing wall means forming a lower surface adapted to engage and be supported on said top wall of said lens-shutter housing, second housing wall means inclined rearwardly and upwardly from and formed integral with said first housing wall means and engaging and supported on said upper housing wall of said camera, third housing wall means formed integral with said second housing wall means and forming a recess receiving the viewfinder of the camera, and fourth housing wall means formed integral with said first, second and third housing wall means and completing an enclosure about said electronic flash unit including housing regions on four sides of said third housing wall means, said means for detachably connecting said housing to said camera comprising a plug mounted on said first housing wall means, protruding therefrom, and engaging said socket, and first and second hook means attached to said second housing wall means on either side of said third housing wall means and engaging said rear edge portion of said upper housing wall of said camera.

* * * * *